(12) United States Patent
Hasegawa et al.

(10) Patent No.: US 7,916,337 B2
(45) Date of Patent: Mar. 29, 2011

(54) PRINTING APPARATUS, EXTERNAL APPARATUS, PRINTING SYSTEM AND CONTROL METHOD FOR PRINTING APPARATUS

(75) Inventors: Tomoya Hasegawa, Tokyo (JP); Masahiko Tominaga, Kawasaki (JP); Masayuki Toda, Yokohama (JP); Yasunori Kanai, Tokyo (JP); Hideyuki Okada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1088 days.

(21) Appl. No.: 11/671,457

(22) Filed: Feb. 5, 2007

(65) Prior Publication Data

US 2008/0037054 A1 Feb. 14, 2008

(30) Foreign Application Priority Data

Feb. 6, 2006 (JP) .................................. 2006-029004

(51) Int. Cl.
G06F 3/12 (2006.01)
G06F 15/16 (2006.01)
G06F 15/167 (2006.01)
G06K 15/00 (2006.01)

(52) U.S. Cl. ..................... 358/1.16; 358/1.13; 358/1.14; 358/1.15; 709/203; 709/209; 709/214; 709/215; 709/216

(58) Field of Classification Search .................. None
See application file for complete search history.

(56) References Cited

U.S. PATENT DOCUMENTS

| 5,852,710 | A * | 12/1998 | Shiohara et al. | 358/1.16 |
| 6,023,343 | A * | 2/2000 | Hoang et al. | 358/1.16 |
| 6,172,761 | B1 * | 1/2001 | Ohtani | 358/1.12 |
| 7,034,954 | B1 * | 4/2006 | Utsunomiya | 358/1.16 |
| 2003/0056146 | A1* | 3/2003 | Freeman et al. | 714/25 |
| 2004/0049608 | A1* | 3/2004 | Sakurai | 710/5 |
| 2004/0145768 | A1* | 7/2004 | Stringham | 358/1.14 |

FOREIGN PATENT DOCUMENTS

| JP | 11234493 | * | 8/1999 |
| JP | 2005-078490 A | | 3/2005 |

* cited by examiner

*Primary Examiner* — Benny Q Tieu
*Assistant Examiner* — Haris Sabah
(74) *Attorney, Agent, or Firm* — Rossi Kimms & McDowell LLP

(57) ABSTRACT

A printing apparatus connected to an external apparatus for temporarily storing a print job including a plurality of pages of image data, receives image data related to the print job from the external apparatus and performs printing using the received image data, comprising a storage unit for temporarily storing the image data received from the external apparatus, a printing unit for performing printing using the image data stored in the storage unit, a determination unit for determining an amount of free area in the storage unit and a control unit for performing a control to switch storage of the image data in the storage unit from storing all of the pages of the image data to storing some of the pages of the image data, in response to the amount of free area determined becoming smaller than a predetermined area during printing.

18 Claims, 11 Drawing Sheets

PRINTING APPARATUS, EXTERNAL APPARATUS, PRINTING SYSTEM AND CONTROL METHOD FOR PRINTING APPARATUS

BACKGROUND OF THE INVENTION

1. Field of the Invention

The present invention relates to a printing apparatus, an external apparatus, a printing system and a control method for the printing apparatus.

2. Description of the Related Art

There is a technique in which an image processing apparatus such as a printing apparatus receives "one copy" worth of data in page order from a document server and temporarily stores the data, and if printing of a plurality of copies is required, the stored data is repeatedly used and output. Also, in the case of collation printing, there is a technique in which stored data is used to perform collation and output, and if double-sided printing is required, data is acquired from the stored data in the print order and output. Here, "collation printing" refers to a configuration in which data is collated and printed in a page order such as 1-2-3, 1-2-3 when printing of a plurality of copies has been specified.

There is also a technique when printing a plurality of copies in which data is transmitted from the document server to the image processing apparatus as many times as the number of copies to be printed, and if collation printing is required, data is collated in the document server and transmitted to the image processing apparatus.

With the above technique, constantly sending data from the server over a number of times equating to the specified number of copies when collation printing a plurality of copies takes extra time for data transmission. Even in the case where the collation is performed by the image processing apparatus, the collation function may not always be available in the image processing apparatus, depending on the size of the document to be output or the like.

In view of this, a technique has been proposed for changing the method by which images are transmitted from an external apparatus according to the remaining area of a storage apparatus in a connected image processing apparatus, and using a collation function that depends on the changed transmission method (see Japanese Patent Laid-Open No. 2005-78490).

However, with this technique, image transmission switching is performed based on the remaining area of the storage apparatus at the start of printing, which means that printing may have to be discontinued if the capacity of the internal storage apparatus proves insufficient during printing. Further, while the image transmission method needs to be changed depending also on the type of print job to be executed, the above technique does not allow for this.

SUMMARY OF THE INVENTION

The present invention allows continued printing, even in the case where the remaining storage area of a storage unit that stores image data changes during the printing of image data related to a print job received from an external apparatus.

Alternatively, the present invention allows continued printing by appropriately controlling the storage of image data in the storage unit according to processing performed using image data related to a print job received from an external apparatus.

The present invention as a printing apparatus for solving the above problems either separately or collectively, is the printing apparatus that is connected to an external apparatus for temporarily storing a print job including a plurality of pages of image data, and that receives image data related to the print job from the external apparatus and performs printing using the received image data, comprising:

a storage unit adapted to temporarily store image data related to the print job received from the external apparatus;

a printing unit adapted to perform printing using image data related to the print job stored in the storage unit;

a determination unit adapted to determine an amount of free area in the storage unit; and a control unit adapted to perform a control to switch storage of the image data in the storage unit from storing all of the pages of image data related to the print job to storing some of the pages of image data related to the print job, in response to the amount of free area determined by the determination unit becoming smaller than a predetermined area during printing by the printing unit.

The present invention as a printing apparatus for further solving the above problems either separately or collectively is the printing apparatus that is connected to an external apparatus for temporarily storing a print job including a plurality of pages of image data, and that receives image data related to the print job from the external apparatus and performs printing using the received image data, comprising:

a storage unit adapted to temporarily store image data related to the print job received from the external apparatus;

a printing unit adapted to perform printing using image data related to the print job stored in the storage unit;

a determination unit adapted to determine what processing is to be executed using the image data; and a control unit adapted to perform a control so that storage of the image data in the storage unit is one of storing all of the pages of image data related to the print job and storing some of the pages of image data related to the print job, according to a result of the determination by the determination unit.

The present invention as an external apparatus for solving the above problems either separately or collectively, is the external apparatus connected to the printing apparatus, further comprising:

a storage unit adapted to store image data; and a transmission unit adapted to transmit image data related to a print job stored in the storage unit to the printing apparatus, in response to a request from the printing apparatus.

The present invention as a printing system for solving the above problems either separately or collectively, is a printing system comprising an external apparatus that temporarily stores a print job including a plurality of pages of image data, and a printing apparatus that is connected to the external apparatus and that receives image data related to the print job from the external apparatus and performs printing using the received image data, wherein the external apparatus includes:

a first storage unit adapted to store image data; and a transmission unit adapted to transmit image data related to the print job stored in the first storage unit to the printing apparatus, in response to a request from the printing apparatus, and the printing apparatus includes:

a second storage unit adapted to temporarily store image data related to the print job received from the external apparatus;

a printing unit adapted to perform printing using image data related to the print job stored in the second storage unit;

a determination unit adapted to determine an amount of free area in the second storage unit; and a control unit adapted to perform a control to switch storage of the image data in the second storage unit from storing all of the pages of image data related to the print job to storing some of the pages of image data related to the print job, in response to the amount of free area determined by the determination unit becoming smaller than a predetermined area during printing by the printing unit.

The present invention as a printing system for solving the above problems either separately or collectively, is the printing system comprising an external apparatus that temporarily stores a print job including a plurality of pages of image data, and a printing apparatus that is connected to the external apparatus and that receives image data related to the print job from the external apparatus and performs printing using the received image data, wherein the external apparatus includes:
a first storage unit adapted to store image data; and
a transmission unit adapted to transmit image data related to the print job stored in the first storage unit to the printing apparatus, in response to a request from the printing apparatus, and the printing apparatus includes:
a second storage unit adapted to temporarily store image data related to the print job received from the external apparatus;
a printing unit adapted to perform printing using image data related to the print job stored in the second storage unit;
a determination unit adapted to determine what processing is to be executed using the image data; and
a control unit adapted to perform a control so that storage of the image data in the second storage unit is one of storing all of the pages of image data related to the print job and storing some of the pages of image data related to the print job, according to a result of the determination by the determination unit.

Further features of the present invention will become apparent from the following description of exemplary embodiments, with reference to the attached drawings.

DESCRIPTION OF THE EMBODIMENTS

Preferred embodiments are described below with reference to the accompanying drawings.

First Embodiment

Figure 1:
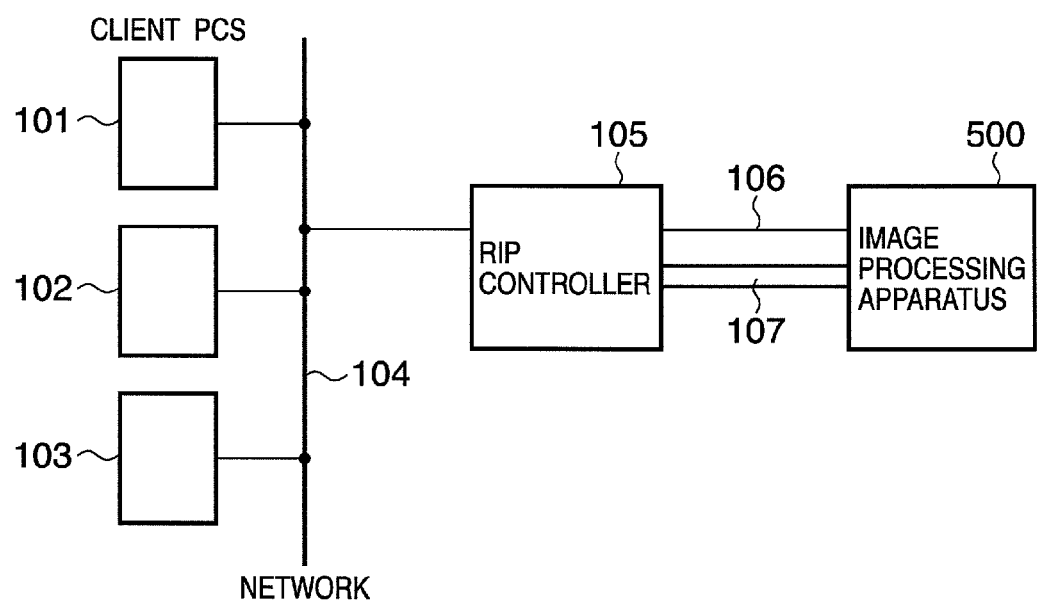
FIG. 1 shows an exemplary system configuration corresponding to embodiments of the present invention.

FIG. 1 shows an exemplary system configuration of the present invention. In FIG. 1, reference numerals 101 to 103 denote client PCs. Among these client PCs 101 to 103, the client PC 101 is described below, although the description is similarly applicable to the client PCs 102 and 103. The client PC 101 is connected to a network 104, and is able to cause an image processing apparatus 500 as a printing apparatus to perform printing via the network.

The network 104 is a network such as a local area network, for example, that makes intercommunication possible and to which a server apparatus and the like are connected in addition to the client PC 101 and a RIP controller 105.

The RIP controller 105 is connected to the network 104, and functions as an external apparatus that performs RIP processing on print data received from the client PC 101 via the network 104, and passes the processed data on to the image processing apparatus 500. Note that a printing system may also be constructed by integrating the RIP controller 105 and the image processing apparatus 500. The RIP controller 105 and the image processing apparatus 500 are connected via a network cable 106 and a video cable 107 for transmitting image data.

The image processing apparatus has a print function, a facsimile function, a scanner function, a box function and the like, and can process print requests from the client PC 101 received from the network 104 via the RIP controller 105.

An exemplary hardware configuration of the image processing apparatus 500 corresponding to the embodiments of the present invention is described next with reference to FIG. 2.

Figure 2:
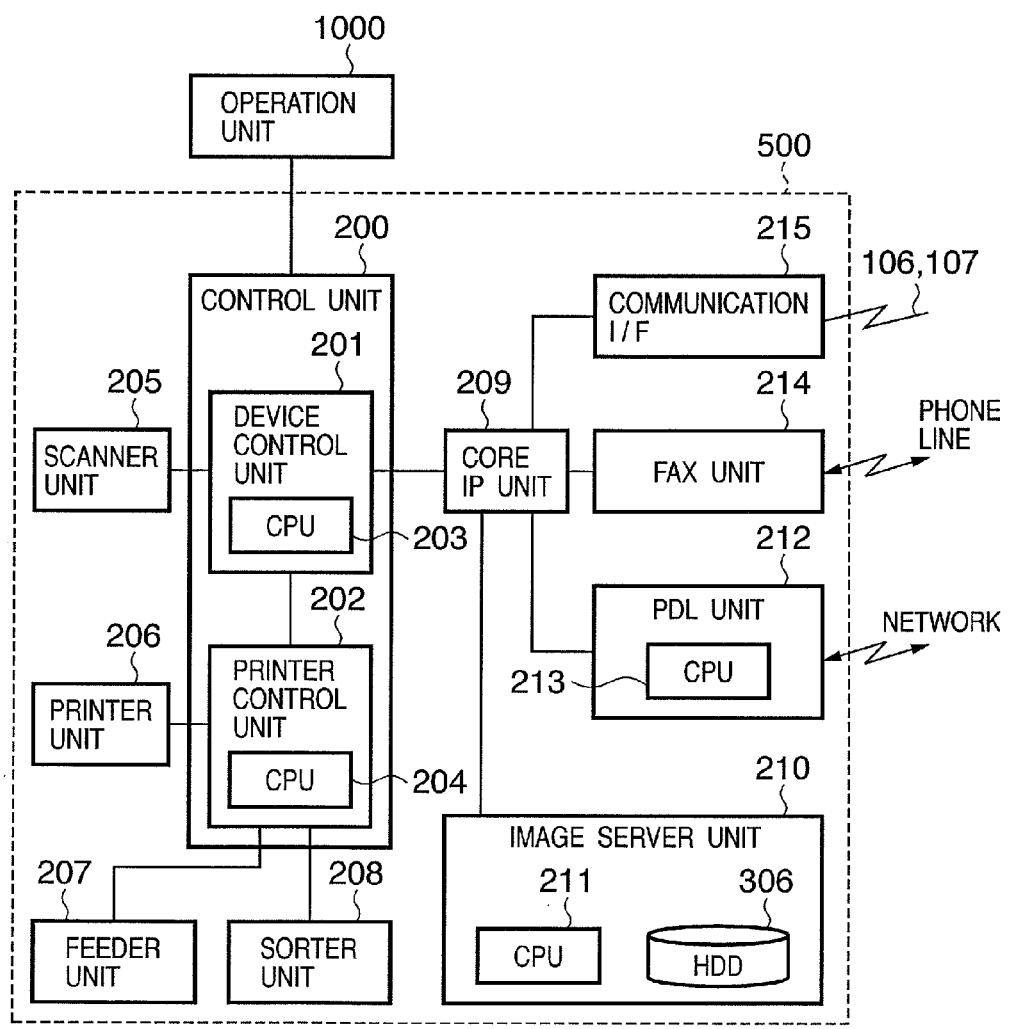
FIG. 2 shows an exemplary hardware configuration of an image processing apparatus 500 corresponding to embodiments of the present invention.

In FIG. 2, a control unit 200 has a device control unit 201 for performing image processing and overall control of the image processing apparatus 500, and a printer control unit 202 that performs mechanical and process controls for forming images on printing paper. The control unit 200 is also connected to an operation unit 1000 of the image processing apparatus. The operation unit 1000 is a user interface for receiving operations from the user of the image processing apparatus 500.

The device control unit 201 is provided with a CPU 203, and controls in the device control unit 201 are performed by the CPU 203. Similarly, the printer control unit 202 is provided with a CPU 204, and controls in the printer control unit 202 are performed by the CPU 204.

A scanner unit 205 reads paper documents electronically using an image sensing device such as a CCD, and generates image data. The scanner unit 205 is controlled by the device control unit 201. A printer unit 206 is a printing unit that prints image data onto a printing medium such as printing paper. The printer unit 206 is controlled by the printer control unit 202.

A feeder unit 207 is used for feeding printing paper within the image processing apparatus 500. A sorter unit 208 is used for collating printed paper. These units are controlled by the printer control unit 202.

A CORE IP unit 209 conveys image data sent from the device control unit 201 to an image server unit 210, a PDL unit 212 and a FAX unit 214.

The image server unit 210 functions to store image data from a host computer via the CORE IP unit 209, and is controlled by a CPU 211. The image server unit 210 is also connected to the device control unit 201 via the CORE IP unit 209, and is accessed for image input/output. Note that the image server unit 210 has a hard disk 306.

The PDL unit 212 renders PDL output from the external client PC 101 or the like having a hard disk as a bitmap image, and outputs the bitmap image to the CORE IP unit 209 as image data. The PDL unit 212 also functions as a network interface for exchanging information with the client PC 101 or the like via the network.

The FAX unit 214 faxes image data read by the scanner unit 205, and receives image data sent via a phone line. The FAX unit 214 is controlled by the device control unit 201 via the CORE IP unit 209.

A communication interface (I/F) 215 is for connecting with the RIP controller 105 via the network cable 106 and the video cable 107.

Figure 3:
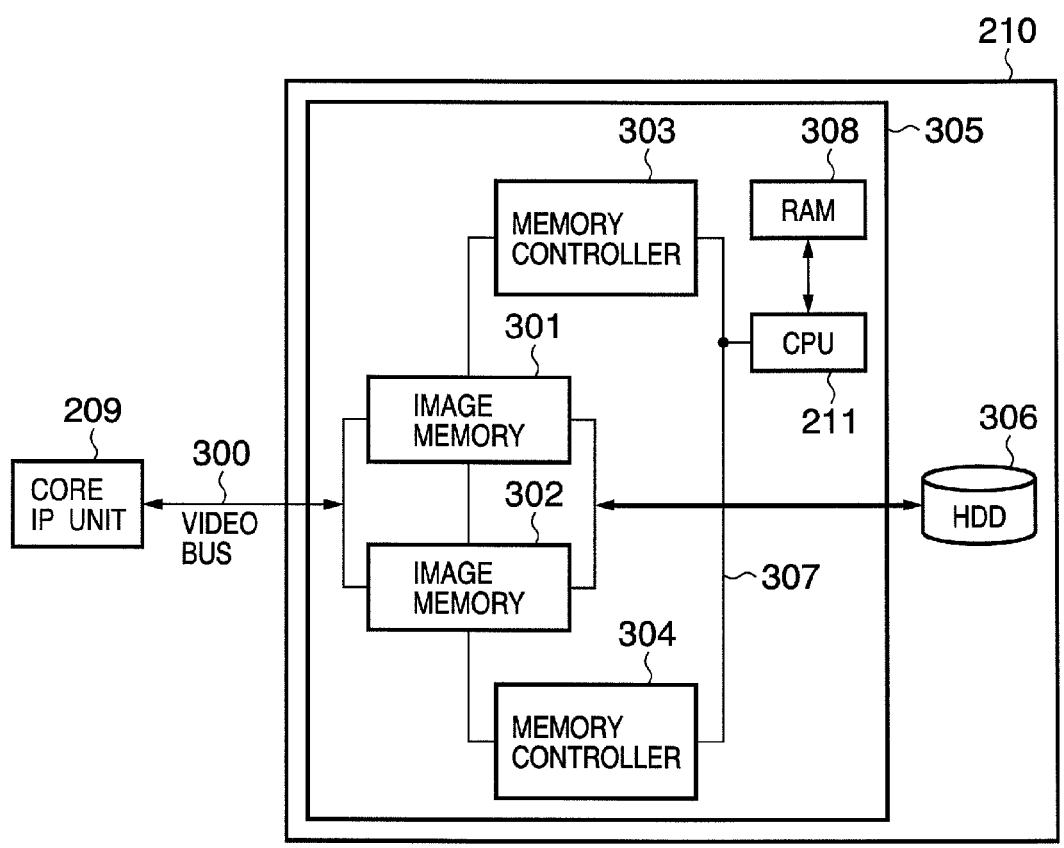
FIG. 3 shows an exemplary hardware configuration of an image server unit corresponding to embodiments of the present invention.

An exemplary hardware configuration of the image server unit 210 is described next with reference to FIG. 3.

Image memories 301 and 302 are storage units for sending and receiving image data to and from the CORE IP unit 209 via a video bus 300, and are able to temporarily store image data. The image memories 301 and 302 also have the capacity to import at least A4 size image data, and are respectively controlled by memory controllers 303 and 304.

The memory controllers 303 and 304 are connected to the image server CPU 211 via a control bus 307, and respectively control the image memories 301 and 302 under the control of the image server CPU 211. The image server CPU 211 controls the overall operations of the image server unit 210, and is provided with a clock function for recognizing the current time.

The image memories 301 and 302 are also connected to the hard disk 306, and image data stored in the image memories 301 and 302 is ultimately stored in the hard disk 306.

The image server unit 210 is thereby able to perform double buffering as a result of having the two image memories 301 and 302. That is, while writing image data in one of the image memories (301) to the hard disk 306, the image server unit 210 can receive image data from the CORE IP unit 209 using the other image memory (302). If the image size exceeds A4, both image memories can also be used continuously (as a single memory) as a cascade buffer.

Figure 4:
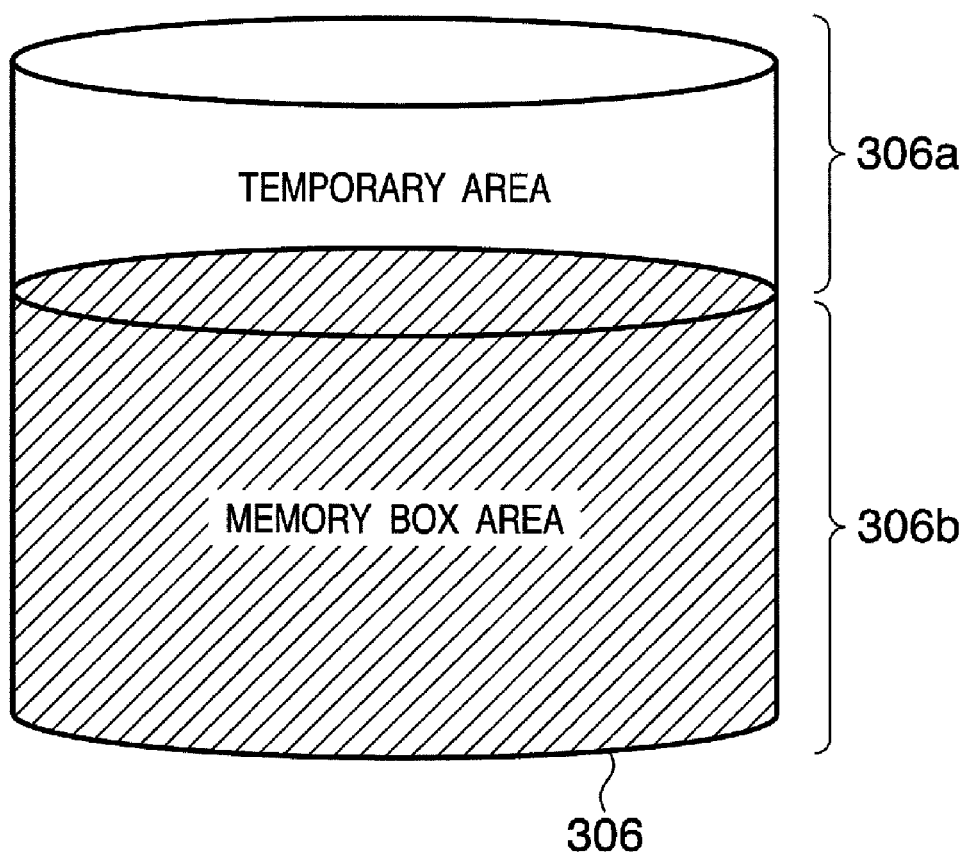
FIG. 4 shows an exemplary internal configuration of a hard disk 306 corresponding to embodiments of the present invention.

An exemplary internal configuration of the hard disk 306 is described next with reference to FIG. 4. The hard disk 306 has a temporary area 306a and a memory box area 306b.

The temporary area 306a temporarily stores image data for electronic sorting or the like, with stored image data being erased after the end of a job. The memory box area 306b is for permanent storage/archiving of image data until the image data is erased.

Figure 5:
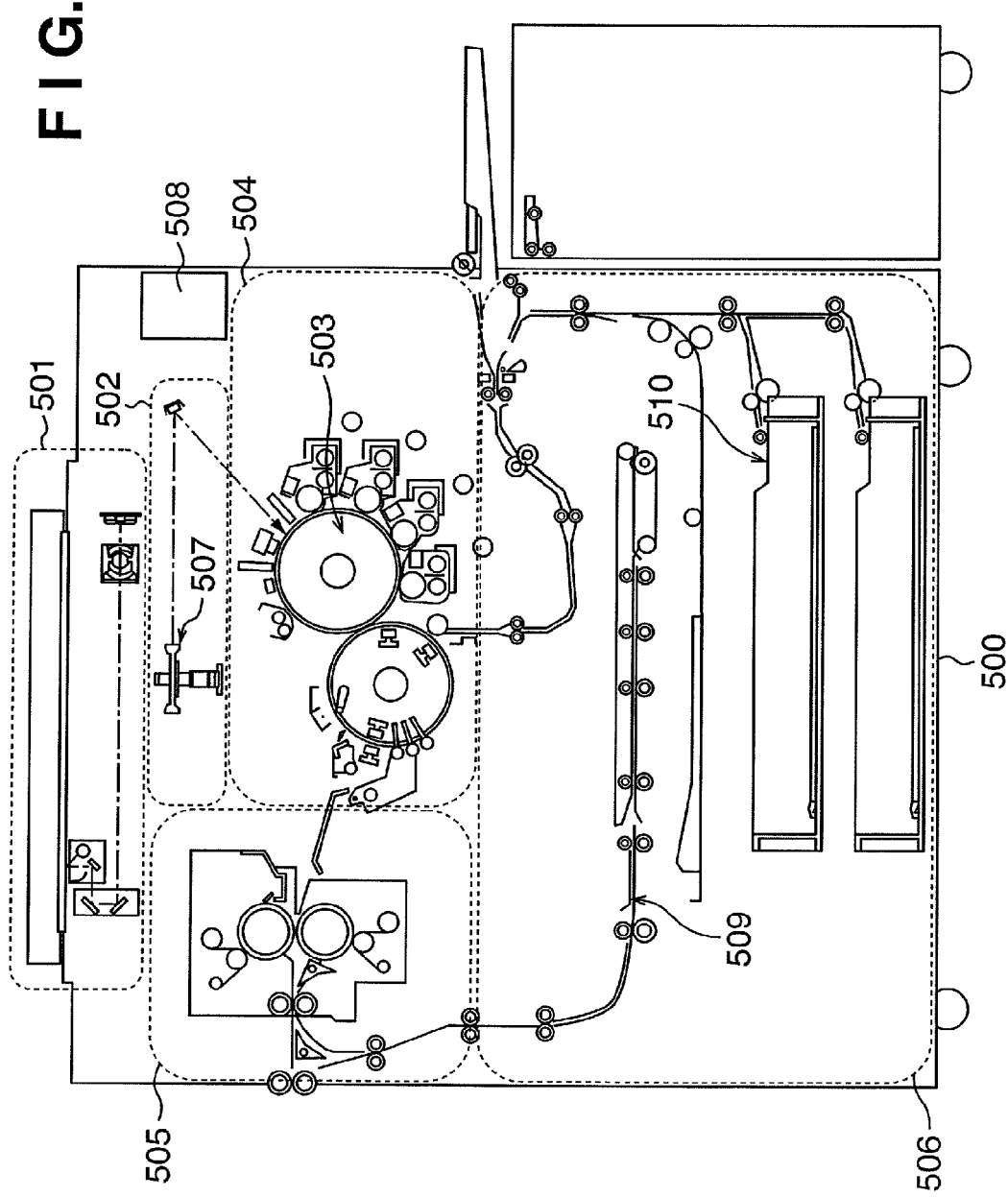
FIG. 5 shows an exemplary sectional view of the configuration of the image processing apparatus 500 corresponding to embodiments of the present invention.

An exemplary device configuration of the image processing apparatus 500 corresponding to the embodiments of the present invention is described next with reference to FIG. 5. FIG. 5 shows an exemplary sectional view of the image processing apparatus 500 when realized as multi-functional peripheral equipment.

In FIG. 5, the image processing apparatus 500 has a scanner unit 501, a laser exposure unit 502, a photoconductive drum 503, an image forming unit 504, a fixing unit 505, and a paper feeding and conveying unit 506, which are controlled by the printer control unit 202. Note that the scanner unit 501 equates to the scanner unit 205, while the laser exposure unit 502, the photoconductive drum 503, the image forming unit 504, the fixing unit 505, and the paper feeding and conveying unit 506 equate to the printer unit 206 in FIG. 2.

The scanner unit 501 reads a manuscript image and converts the read manuscript image to image data. The laser exposure unit 502 irradiates a light beam such as a laser beam, for example, modulated according to the image data onto the photoconductive drum 503 as reflected scanning light by causing the light beam to be incident on a rotating polygon mirror 507 that rotates at constant angular velocity.

The image forming unit 504 rotation-drives the photoconductive drum 503 to charge the photoconductive drum using a charger, and uses toner to develop a latent image formed on the photoconductive drum 503 by the laser exposure unit 502. Further, the toner image is transferred to sheet material, and the small particles of toner remaining on the photoconductive drum 503 after the transfer process are collected. This series of image forming processes is executed sequentially using yellow (Y), magenta (M), cyan (C) and black (K) toner. Executing the series of image forming processes four times on one sheet of sheet material enables a full color image to be formed on the sheet material.

The fixing unit 505, which is configured by a combination of rollers and belts, and incorporates a heat source such as a halogen heater, fuses the toner to the sheet material onto which the toner image has been transferred by the image forming unit 504 to fix the toner image by applying heat and pressure.

The paper feeding and conveying unit 506, which has at least one repository 510 for storing sheet material, separates one sheet from the plurality of sheets of sheet material stored in the repository 510 in response to an instruction from the printer control unit 202, and conveys the separated sheet material to the image forming unit 504 and the fixing unit 505. The sheet material is wound around the transfer drum of the image forming unit 504, and conveyed to the fixing unit 505 after four rotations. The YMCK toner images are transferred to the sheet material during the four rotations.

In the case of image forming being performed on both sides of the sheet material, a control is performed to pass sheet material that has been through the fixing unit 505 via a conveying path that again conveys the sheet material to the image forming unit 504. The printer control unit 202 is connected to the device control unit 201 via a dedicated I/F, and communicates with the device control unit 201, executing controls according to instructions and notifying the status of the various units.

An overview of the operations performed by various units from power OFF to operation ready is given next. Firstly, when power is applied, the printer control unit 202 instructs the scanner unit 501, the laser exposure unit 502, the image forming unit 504, the fixing unit 505, and the paper feeding and conveying unit 506 to start preparatory operations, and waits for communication with the device control unit 201 to start. Once communication is established with the device control unit 201, the control units 201 and 202 exchange their respective device specifications. Then, once the units have ended their preparatory operations and image forming is operable, the printer control unit 202 notifies the device control unit 201 that image forming is operable.

The printer control unit 202 notifies the device control unit 201 of the status of the units, an example of this being given below. Firstly, the paper feeding and conveying unit 506 detects the size of the sheet material stored in the repository 510, the remaining quantity (load) of sheet material stored in the repository 510, and the operational status of the drive unit (whether the drive unit is operable or out of order), and notifies the device control unit 201. Next, the image forming unit 504 notifies the device control unit 201 of the amount of toner stored in the YMCK toner holders.

Next, an overview is given of the operations performed by various units from the notification of an operating instruction by the device control unit 201 in the ready state until the completion of the series of print operations. Firstly, the device control unit 201 notifies an operation start command to the printer control unit 202. On receiving the operation start command, the printer control unit 202 instructs the laser exposure unit 502, the image forming unit 504, the paper feeding and conveying unit 506, and the fixing unit 505 to start print operations.

The laser exposure unit 502 starts rotating the motor (polygon motor) that drives the polygon mirror 507. The image forming unit 504 rotation-drives the photoconductive drum 503 and charges the photoconductive drum 503. The fixing unit 505 turns the heater on, and raises the fixing unit 505 to a temperature that enables toner on the sheet material to be fixed. The paper feeding and conveying unit 506 makes the drive unit (motor) conveyable. Once the units are in an operation ready state, the printer control unit 202 notifies the device control unit 201 that preparation has been completed.

On being notified by the printer control unit 202 that preparation has been completed, the device control unit 201 then instructs print operations in page units. If a print job is for 20 copies of 10 pages, for example, the device control unit 201 issues a print operation instruction for 200 pages. On receiving the print operation instruction, the printer control unit 202 firstly instructs the image forming unit 504 to start image forming, and then sends paper feed instructions to the paper feeding and conveying unit 506 at a predetermined timing.

If the sheet material is feedable, the paper feeding and conveying unit 506 feeds one sheet of sheet material, and winds the sheet material onto the transfer drum of the image forming unit 504. If paper feeding is not possible because of there being no sheet material in the repository 510, for instance, the paper feeding and conveying unit 506 notifies the printer control unit 202 that paper feeding is not possible. The paper feeding and conveying unit 506 can also have a double feeding detection sensor for detecting when sheet material is being conveyed on the conveying path in a doubled up state (double feeding), or a thickness detection sensor for detecting the thickness of the sheet material. If these sensors detect double feeding or an irregularity, the paper feeding and conveying unit 506 interrupts the feeding and conveying, and notifies the printer control unit 202 of the irregularity.

The printer control unit 202, in this case, notifies the device control unit 201 of the reason for the interrupt and the position of sheet material still inside the apparatus. The sheet material, if conveyed normally, is wound onto the transfer drum at a predetermined position, and rotated four times. This control results in a full color toner image being transferred to the sheet material. After being rotated four times, the sheet material is removed from the transfer drum and conveyed to the fixing unit 505. The fixing unit 505 monitors the temperature of the fixing unit 505 and performs a control so that it reaches a suitable fixing temperature, although if the sheet material absorbs a large amount of heat from the fixing unit 505, the temperature of the fixing unit 505 may drop.

In this case, the fixing unit 505 notifies the printer control unit 202 of the drop in temperature of the fixing unit 505, and on receipt of this notification, the printer control unit 202 widens the conveying interval between the sheets of sheet material to ensure that the temperature of the fixing unit 505 does not drop further. If the temperature of the fixing unit 505 still does not recover, the printer control unit 202 performs a control to interrupt operations and then resume operations after the temperature has recovered. Once the sheet material has been discharged completely, the printer control unit 202 instructs each unit to stop operations, and notifies the device control unit 201 of the end of the operations after receiving notification from each unit that operations have been stopped.

Figure 6:
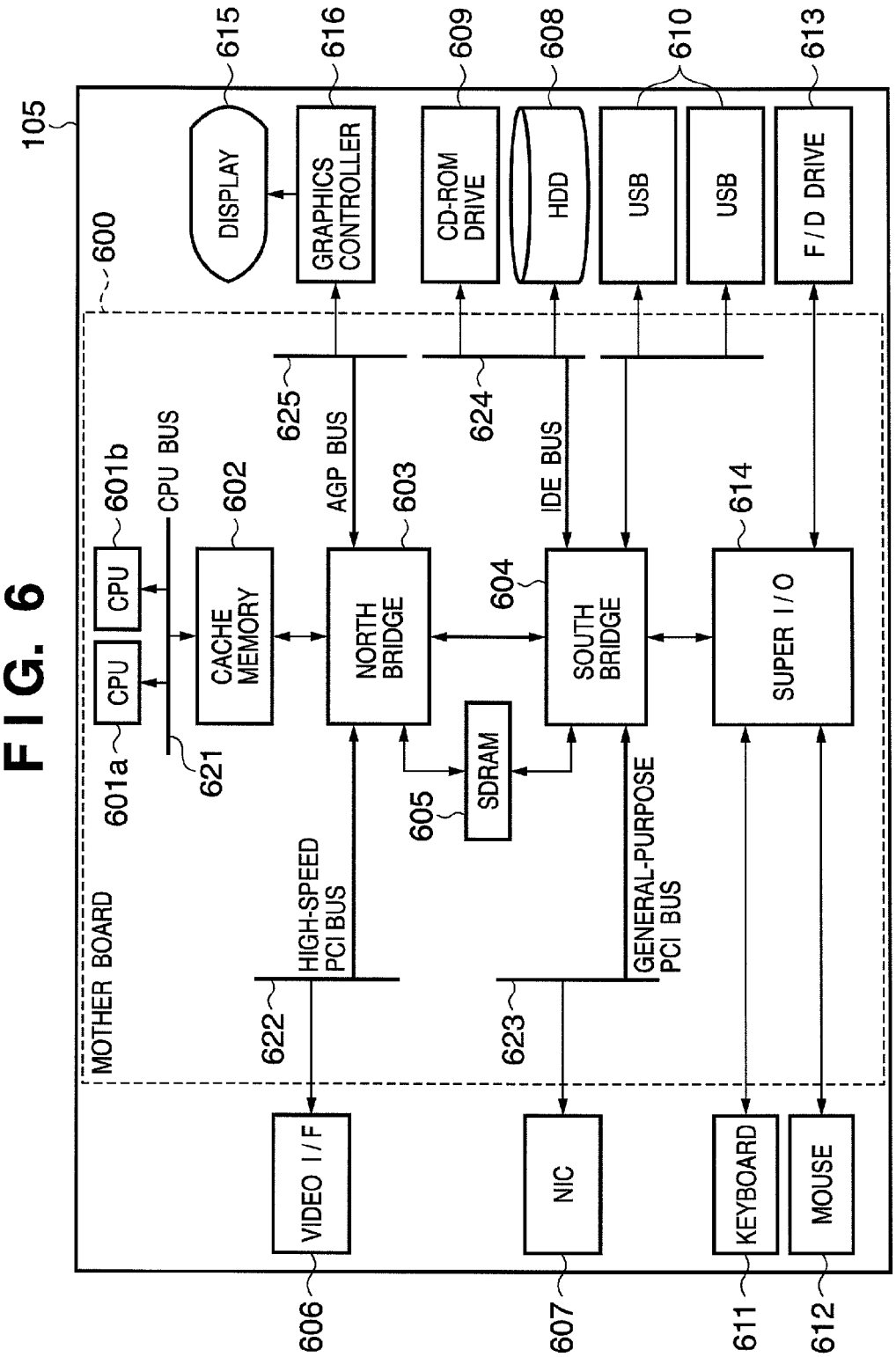
FIG. 6 shows an exemplary hardware configuration of a RIP controller 105 corresponding to embodiments of the present invention.

An exemplary hardware configuration of the RIP controller 105 is described next with reference to FIG. 6. Note that the hardware of the RIP controller 105 is a commonly known configuration having various connection methods and buses/interfaces, and that the hardware configuration introduced here is but one example thereof.

Firstly, the functions described below are mounted on a board called a motherboard 600 that corresponds to the portion enclosed by the dotted line. The two CPUs 601a and 601b (CPU 601) control the entire software in the RIP controller 105, and are connected to a cache memory 602 via a CPU bus 621. The CPU 601 further controls the various buses on the motherboard using LSI (Large Scale Integration) chips called a north bridge 603 and a south bridge 604. An SDRAM 605 begins data exchange between the north bridge 603 and the south bridge 604, and is used for primary storage of data in the RIP controller 105.

The north bridge 603 has a high-speed PCI (Peripheral Component Interconnect) bus 622. Although a 32 bit/66 MHz bus is widely known, a high-speed PCI Express or PCI-X bus, which achieves a higher speed, may also be used as this high-speed PCI bus 622. Connected to the high-speed PCI bus 622 in the present embodiment is a video interface (I/F) 606 for sending video data directly to a printer. High-resolution image data can thereby be transmitted to the image processing apparatus 500, and image data generated by scanning in the image processing apparatus 500 can be imported to the RIP controller 105.

The north bridge 603 further has an APG (Accelerated Graphics Port) bus 625, and can connect a display 615 via a graphics controller 616. Displaying image data on the display 615 is thereby possible.

The south bridge 604 has a general-purpose PCI bus 623 (32 bit/33 MHz), and has a NIC (Network Interface Card) 607 such as an Ethernet (registered trademark) card connected thereto. The south bridge 604 is further provided with an IDE (Integrated Disk Electronics) bus 624, and has a hard disk drive (HDD) 608 and a CD-ROM drive 609 connected thereto.

Here, a variety of data is stored on the HDD 608, including control software for the RIP controller 105. Also included is image data related to print jobs received from the client PC 101 via the network 104. That is, the RIP controller 105 stores all of the pages of image data for a print job in the HDD 608, and transmits the image data one page at a time in response to a transmission request from the image processing apparatus 500.

The CD-ROM drive 609 enables the use of CD-ROMs (or CD-R, CD-RW), which are useful for data reading when installing the RIP controller 105 for example, data storage (archiving) of mass data or the like. Note that the CD-ROM drive 609 may also be a DVD (DVD-R, DVD-RW, DVD-RAM) drive.

A USB port 610 is used for accessing USB external apparatuses, a typical example of which is a USB memory. USB external apparatuses also include hardware keys called dongles for preventing unauthorized duplicating of software. In some cases, software in the RIP controller 105 will not operate unless a dongle is connected, and even if software is duplicated onto another computer, the software may inoperable as long as a dongle is not connected.

A super I/O unit 614 connects a keyboard 611 and a mouse 612, or a Floppy (registered trademark) disk drive (F/D drive) 613 to enable data input/output.

Exemplary image transmission switching operations in the present embodiment are described next with reference to the flowcharts of FIGS. 7 to 10.

Figure 7:
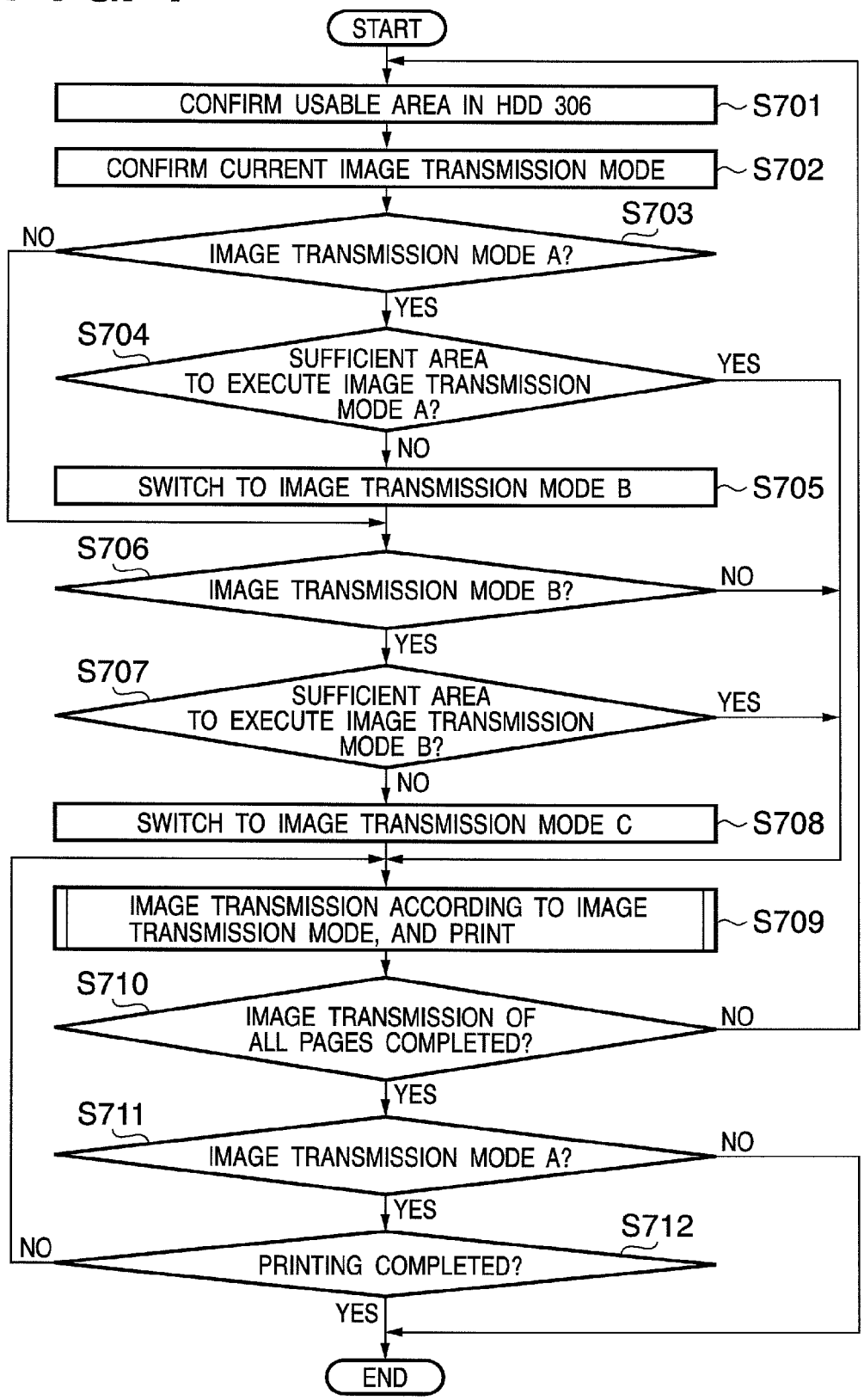
FIG. 7 is a flowchart showing exemplary processing for switching image transmission modes corresponding to a first embodiment of the present invention.

FIG. 7 shows exemplary processing in which the image processing apparatus 500 investigates the amount of free area in the temporary area 306a, and then receives and outputs images after switching the image transmission method requested of the RIP controller 105 depending on the amount of free area.

Figure 8:
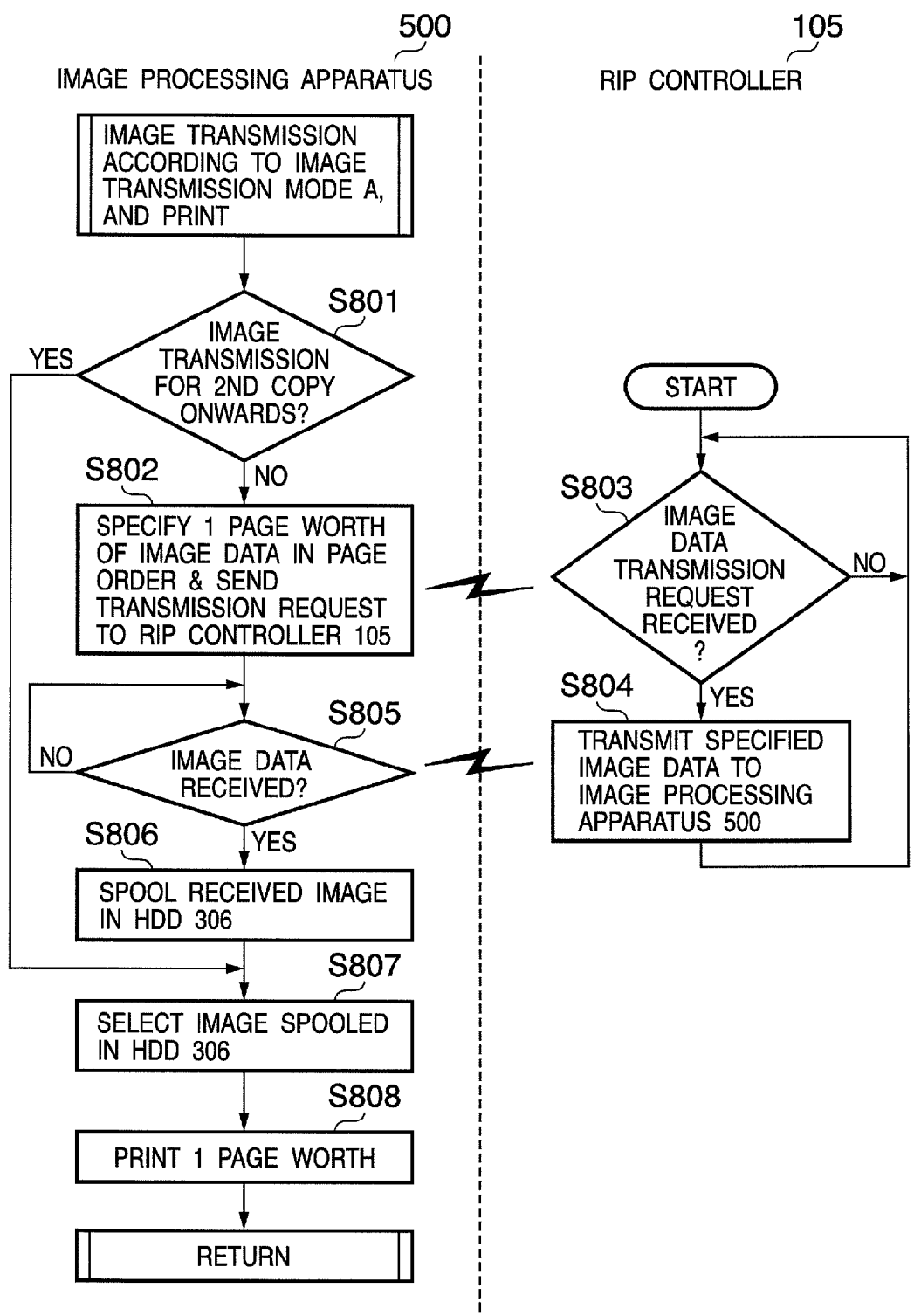
FIG. 8 is a flowchart showing exemplary processing in an image transmission mode A corresponding to embodiments of the present invention.
Figure 9:
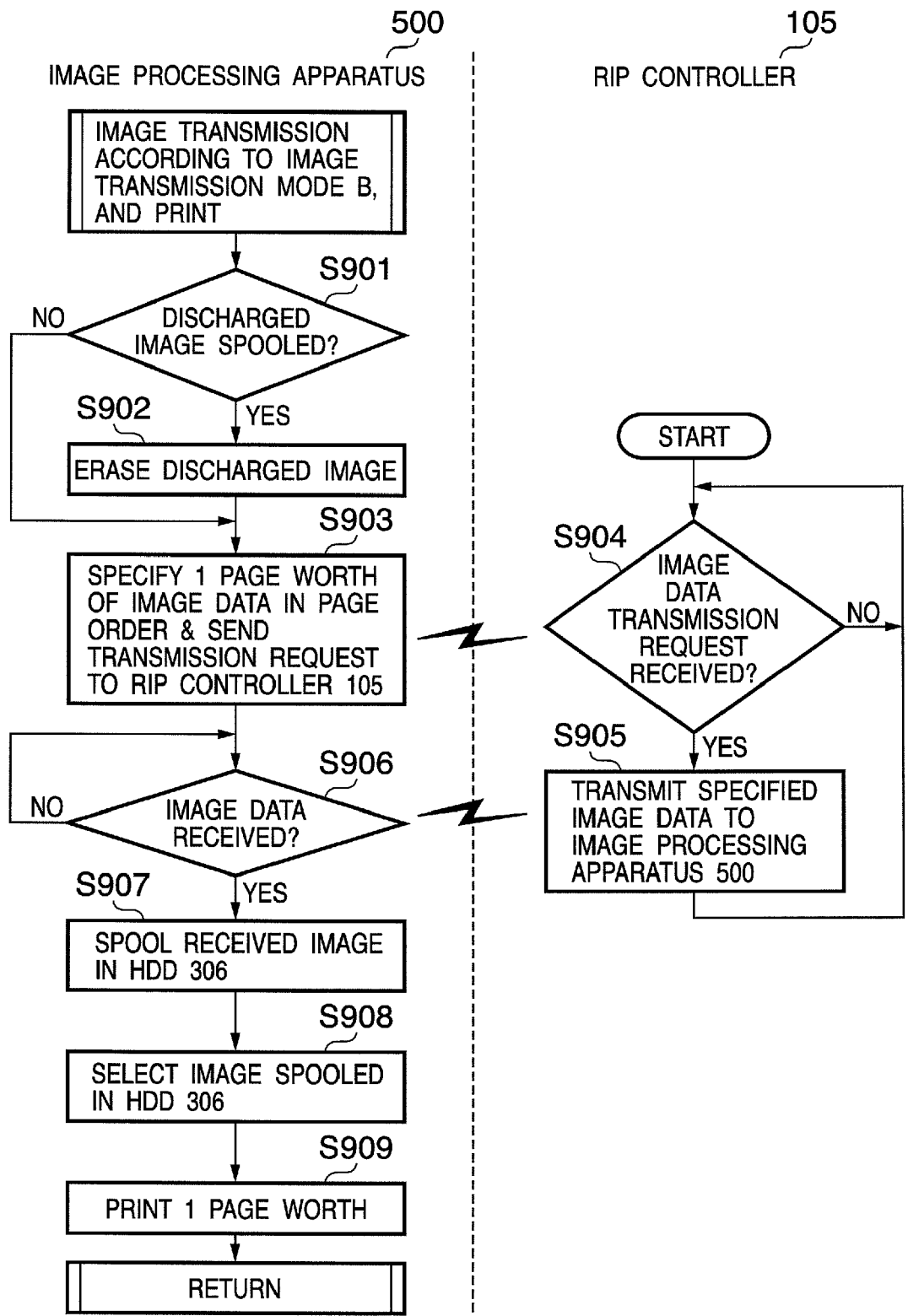
FIG. 9 is a flowchart showing exemplary processing in an image transmission mode B corresponding to embodiments of the present invention.
Figure 10:
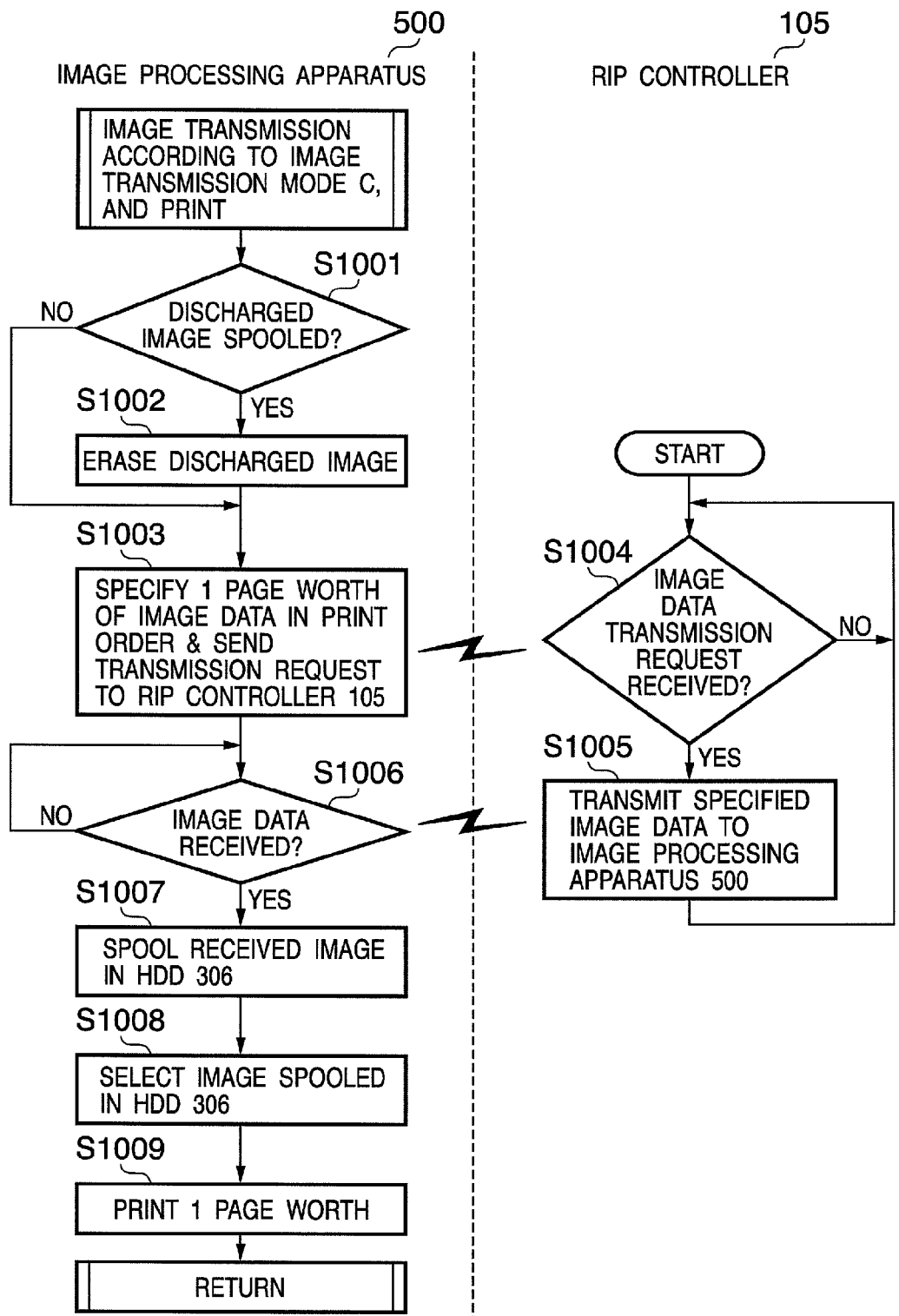
FIG. 10 is a flowchart showing exemplary processing in an image transmission mode C corresponding to embodiments of the present invention.

FIGS. 8 to 10 show, as an example, processing procedures for requesting the RIP controller 105 for image transmission and receiving images in various image transmission modes. Here, FIGS. 8, 9 and 10 correspond to image transmission modes A, B and C, respectively.

The processing shown in FIGS. 7 to 10 is enabled by the CPU 211 executing processing programs stored in the HDD 306 and read to the RAM 308 of the image server unit 210.

Here, image transmission mode A involves all of the pages of image data for "one copy" being transmitted from the RIP controller 105 to the image processing apparatus 500 in the page order constituting the image data, and all of the image data being spooled in the HDD 306. All of the pages of image data for "one copy" received from the RIP controller 105 in page order are spooled in the temporary area 306a of the HDD 306, and if printing of a plurality of copies is required, the spooled image data is reused. In the case of double-sided printing or collated output, the image data spooled in the HDD 306 in print order is used sequentially and output. If, for example, 10 pages of document data are to be printed in image transmission mode A, the image data from page 1 to page 10 in order is transmitted to the image processing apparatus 500, and spooled.

Image transmission mode B involves image data being transmitted from the RIP controller 105 to the image processing apparatus 500 in the page order of the print document, and if plural copies are required, image data is again transmitted from the RIP controller 105 in page order from the second copy onwards. The image processing apparatus 500 at this time only spools in the HDD 306 those pieces of image data received from the RIP controller 105 in page order that are required for printing, and erases spooled image data from the HDD 306 once discharging has ended. Image data required next is then received from the RIP controller 105, and spooled in the HDD 306. With image transmission mode B, the minimum required number of pages worth of image data is thereby spooled in the HDD 306.

If, for example, 10 pages of document data are to be printed in image transmission mode B, the image data from page 1 to page 10 in order is transmitted to the image processing apparatus 500. Depending on the printing configuration (double-sided printing, binding settings, etc.), however, the printing sequence may not necessarily match the transmission sequence. Consequently, transmitted image data not used in printing is held in the temporary area 306a. Then, when its printing sequence arrives and it is used in printing, the image data is erased from the temporary area 306a.

Next, image transmission mode C involves image data being transmitted from the RIP controller 105 to the image processing apparatus 500 in print order, transmitted image data being spooled in the temporary area 306a, and then erased once printing has ended. Here, all of the pages of image data required for printing are transmitted in print order from the RIP controller 105 irrespective of the number of print copies. If the print order is 1, 10, 2, 9, . . . , for example, image data is transmitted from the RIP controller 105 to the image processing apparatus 500 in accordance with this print order, even in the case of printing all 10 pages of a document.

Firstly, at step S701 in FIG. 7, the CPU 211 in the image server unit 210 confirms the amount of free area in the temporary area 306a of the HDD 306.

Next, in step S702, the CPU 211 confirms the current image transmission mode set in the RAM 308. If image transmission mode A is set (step S703: YES.), processing moves to step S704. On the other hand, if image transmission mode A is not set (step S703: NO), processing moves to step S706.

At step S704, the CPU 211 calculates whether the free area of the temporary area 306a in the HDD 306 confirmed in step S701 is sufficient to execute image transmission mode A. Here, sufficient area to execute image transmission mode A means at least the data size required for spooling all of the pages of image data for printing "one copy" of the print copies.

Note that although the free area in the temporary area 306a may be set as the free area in all areas of the HDD 306 besides the memory box area 306b, other configurations are also acceptable. For example, a facsimile area for storing image data received by the FAX unit 214 may be secured in the temporary area 306a in advance, and the amount of free area determined in an area excluding the facsimile area from the temporary area 306a. Securing a facsimile area in advance safeguards against not being able to store image data received by the FAX unit 214 in the HDD 306. Note that areas for other purposes may be secured besides a facsimile area, and the amount of free area determined in an area excluding those areas from the temporary area 306a.

If there is sufficient area in the HDD 306 to execute image transmission mode A (step S704: YES), processing moves to step S709. At step S709, image transmission from the RIP controller 105 is performed and one page worth of printing is executed in the current image transmission mode A. Processing procedures according to image transmission mode A in step S709 are described below with reference to the flowchart of FIG. 8.

In the flowchart of FIG. 8, the CPU 211 in step S801 determines whether the page currently targeted for printing is part of a second copy onwards in plural copy printing.

If the current page is part of the first copy (step S801: NO), processing moves to step S802. At step S802, the CPU 211 requests the RIP controller 105 via the communication I/F 215 to transmit one page worth of image data targeted for printing in the page order of the document.

In the RIP controller 105, the CPU 601 in step S803 monitors whether a transmission request for image data has been received from the image processing apparatus 500. If a transmission request has been received (step S803: YES), processing moves to step S804. At step S804, the CPU 601 selects image data specified in the transmission request from the HDD 608 in the RIP controller 105, and transmits the selected image data to the image processing apparatus 500. The image data is at this time transmitted to the image processing apparatus 500 by the video cable 107 via the video I/F 606.

In the image processing apparatus 500, the CPU 211 in step S805 monitors whether image data has been received from the RIP controller 105. If image data has been received by the communication I/F 215 (step S805: YES), processing moves to step S806. At step S806, the received image data, having passed through the CORE IP unit 209, is temporarily saved to the image memory 301 or 302, and then spooled in the temporary area 306a of the hard disk 306.

At the subsequent step S807, the targeted image data spooled in the temporary area 306a is read to the image memory 301 or 302 under the control of the CPU 211. At the subsequent step S808, the image data read to the image memory 301 or 302 is transmitted to the printer control unit 202 via the CORE IP unit 209, and one page worth of printing is executed in the printer unit 206. Note that if targeted image data has not yet been spooled, that is, if the print order differs from the page order, steps S807 and S808 are skipped.

Once one page worth of printing has ended, processing moves to step S710, where it is determined whether transmission to the temporary area 306a of all of the pages of image data to be printed has been completed. The determination criteria here differ depending on the image transmission mode set at the time. That is, because all image data transmitted in printing the first copy is spooled in the temporary area 306a in image transmission mode A, the determination result in step S710 will be "YES" if all of the image data has been spooled in the temporary area 306a.

Note that since image data which has been used in printing is erased from the temporary area 306a in image transmission modes B and C, image data transmission must be performed again in the case of printing a plurality of copies. Consequently, in the case of image transmission modes B and C, it is determined at step S710 whether all of the image data required to complete printing of the scheduled number of copies has been transmitted. If processing a job for printing 3 copies of 10 pages of image data, for example, the determination result in step S710 will be "YES" for the first time when a total of 30 pages worth of image data has been transmitted.

In the determination of step S710, the CPU 211 can count the number of pages of image data spooled according to the image transmission mode, and perform the determination based on the count value. The count value can at this time be stored in the RAM 308.

If "one copy" worth of image data has all been transmitted in image transmission mode A (step S710: YES), processing moves to step S711. At step S711, it is determined whether the image transmission mode set at the time is "image transmission mode A".

If image transmission mode A is set (step S711: YES), the possibility exists that printing has not been completed even though "one copy" worth of image data has been transmitted in step S710. In view of this, at step S712, the CPU 211 further determines whether printing has been completed. If printing has not been completed (step S712: NO), processing is continued after returning to step S709. On the other hand, if printing has been completed (step S712: YES), processing is ended since the required number of copies have been printed.

Note that if image transmission mode A is not set (step S711: NO), processing is directly ended. This is because if it is determined in step S710 that image transmission of all pages has been completed in the case of image transmission mode B or C being set, the scheduled number of copies would also have been printed.

If it is determined in step S710 that one copy worth of image data has not all been transmitted (step S710: NO), processing is continued after returning to step S701. In this case, the CPU 211 confirms the free area in the temporary area 306a of the HDD 306 (step S701), and determines whether execution of image transmission mode A is possible (step S704).

This determination is performed because there are times, even during printing in image transmission mode A, when an interrupt job occurs, or the job in image transmission mode A is suspended to execute another job. That is, there exist times when the free area of the temporary area 306a is used by another job, and it becomes difficult to continue executing a print job that was being executed in image transmission mode A in the same image transmission mode. In such cases, a switch must be made from image transmission mode A to image transmission mode B or C before printing is continued. Accordingly, even if the image transmission mode was initially set to A, the free area of HDD 306 is checked whenever one page worth of image data is transmitted to determine whether the current print job is executable in the same image transmission mode, until "one copy" worth of image data has been spooled.

Next, if it is determined at step S704 that there is not sufficient free area in the temporary area 306a for executing image transmission mode A (step S704: NO), processing moves to step S705.

In step S705, the CPU 211 sets the image transmission mode set in the RAM 308 to B. Processing then moves to step S706.

At step S706, the CPU 211 determines whether image transmission mode B is set. If image transmission mode B is set (step S706: YES), processing moves to step S707. On the other hand, if image transmission mode B is not set, processing moves to step S709.

At step S707, the CPU 211 determines whether the free area of the temporary area 306a in the HDD 306 acquired in step S701 is sufficient to execute image transmission mode B (whether the free area is greater than or equal to a predetermined area).

Here, sufficient area (predetermined area) to execute image transmission mode B is an area corresponding to the maximum number of pages of image data held at any one time in order to execute the specified print mode. For example, if image data is received in the page order of the print document, and the print order differs from this, an area greater than or equal to the data size of 3 pages worth of image data is required, assuming that a maximum of 3 pages Worth of image data must be held at one any time.

If there is sufficient area in the temporary area 306a to execute image transmission mode B (step S707: YES), image transmission is performed in image transmission mode B in step S709.

Processing procedures according to image transmission mode B in step S709 are described below with reference to the flowchart of FIG. 9.

In the flowchart of FIG. 9, the CPU 211 in step S901 determines whether the image data of a discharged image is spooled in the temporary area 306a of the HDD 306. If the image data of a discharged image is spooled (step S901: YES), the CPU 211 erases the image data for that image from the HDD 306 in step S902. On the other hand, if the image data of a discharged image is not spooled (step S901: NO), processing moves to step S903.

Since the processing from steps S903 to S909 is similar to the processing from steps S802 to S808 in FIG. 8, description is omitted here.

Once one page worth of image data has been printed in image transmission mode B as described above, processing moves to step S710, where it is determined whether image data required for printing the scheduled number of copies has all been transmitted. If it is determined that transmission has been completed (step S710: YES), processing moves to step S711. At step S711, it is determined whether image transmission mode A is set. Because image transmission mode B is set in this case (step S711: NO), processing is ended.

Note that if image transmission has not been completed in step S710 (step S710: NO), processing is continued after returning to step S701. In this case, the free area of the temporary area 306a in the HDD 306 is confirmed again (step S701), and it is determined whether execution of image transmission mode B is possible (step S707).

This determination is performed because of the possibility of not being able to sustain image transmission mode B due to the occurrence of another job, similarly to the above case of image transmission mode A. If it is determined at step S707 that there is not sufficient free area in the temporary area 306a to execute image transmission mode B (step S707: NO), processing moves to step S708. In this case, this means that while the free area of temporary area 306a is insufficient to store a plurality of pages of image data, there is capacity for storing at least one page worth.

In step S708, the CPU 211 sets the image transmission mode set in the RAM 308 to C. Processing then moves to step S709. At step S709 image transmission and printing is performed in image transmission mode C. Processing procedures according to image transmission mode C in step S709 are described using the flowchart of FIG. 10.

In the flowchart of FIG. 10, the CPU 211 in step S1001 determines whether the image data of a discharged image is spooled in the temporary area 306a of the HDD 306. If the image data of a discharged image is spooled (step S1001: YES), the CPU 211 erases the image data for that image from the HDD 306 in step S1002. On the other hand, if the image data of a discharged image is not spooled (step S1001: NO), processing moves to step S1003.

At step S1003, the CPU 211 requests the RIP controller 105 via the communication I/F 215 for transmission of one page worth of targeted image data in the print order of the document. Since spooling in image transmission mode C is performed using the minimum capacity, that is, the capacity for one page worth of image data, the CPU 211 only requests the RIP controller 105 each time for image data to be used in print order.

Since the processing from steps S1004 to S1009 is similar to the processing from steps S904 to S909, description is omitted.

Once one page worth of image data has been printed in image transmission mode C as described above, processing moves to step S710, where it is determined whether image data required for printing the scheduled number of copies has all been transmitted. If it is determined that transmission has been completed (step S710: YES), processing moves to step S711. At step S711, it is determined whether image transmission mode A is set. Because image transmission mode C is set in this case (step S711: NO), processing is ended.

Note that if image transmission has not been completed in step S710 (step S710: NO), processing is continued after returning to step S701.

According to the present embodiment, as seen above, the mode of transmitting image data from the RIP controller 105 can be changed even during printing, according to the free area in the temporary area 306a for spooling image data. Consequently, it is possible to execute printing according to the free area.

Second Embodiment

A second embodiment is described next. In the first embodiment, the image transmission mode is switched according to the size of the free area in the temporary area 306a, which is an area for spooling image data. In contrast, the present embodiment is characterized in that the image transmission mode is switched according to the print mode.

Exemplary processing for switching image transmission modes corresponding to the present embodiment is described with reference to the flowchart of FIG. 11.

Figure 11:
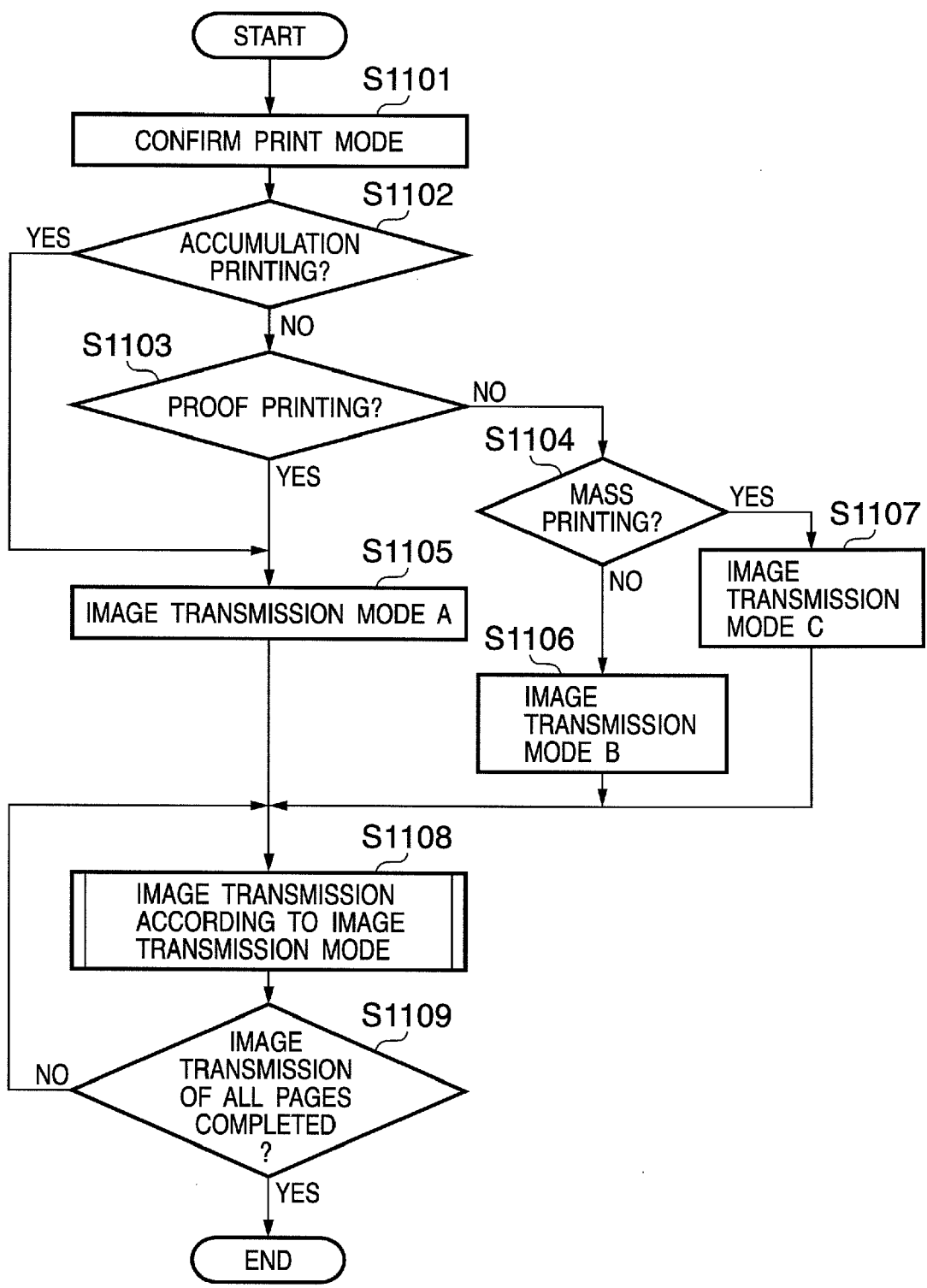
FIG. 11 is a flowchart showing exemplary processing for switching image transmission modes corresponding to a second embodiment of the present invention.

In FIG. 11, the CPU 203 of the device control unit 201 at step S1101 confirms the print mode of printing specified by the client PC 101 and for execution via the RIP controller 105. If the specified print mode is accumulation printing in which image data is accumulated in the memory box area 306b of the HDD 306 in the image processing apparatus 500 (step S1102: YES), processing moves to step S1105.

At step S1105, the CPU 211 sets the image transmission mode to A, and writes the setting to RAM 308. This is because in the case where the print mode is set to accumulation printing of image data to the HDD 306, it will be necessary to accumulate all of the pages of image data for at least one copy.

Then, in step S1108, image transmission is performed in the set image transmission mode. Since image transmission mode A was set in step S1105 in this case, the image processing apparatus 500 requests the RIP controller 105 for transmission of image data in the page order of the print document.

The further detailed processing in step S1108 is pursuant of FIG. 8, although since printing is not required here, processing to store the image data spooled in the temporary area 306a to the memory box area 306b is performed at step S808. Note that storage to the memory box area 306b can be performed after all of the pages of image data have been acquired.

At step S1109, it is determined whether image transmission of all pages has been completed. If image transmission has been completed (step S1109: YES), processing is ended. On the other hand, if image transmission has not been completed (step S1109: NO), processing is repeated after returning to step S1108. That is, the same processing is repeated until all of the pages of image data have been spooled.

Note that even in the case where a plurality of copies are to be accumulated in the memory box area 306b, the printing of a plurality of copies can be handled by reusing accumulated image data, making it possible to accumulate only "one copy" worth of image data and use that image data for outputting if necessary.

Next, if in step S1102 the print mode is not accumulation printing of image data to the HDD 306 (step S1102: NO), processing moves to step S1103. At step S1103, the CPU 203 determines whether the specified print mode is proof printing. Proof printing is a print mode in which image data is accumulated in the HDD 306 of the image processing apparatus 500, and printing output is started in response to an instruction from the user.

If proof printing is specified (step S1103: YES), processing moves to step S1105. At step S1105, the CPU 211 sets the image transmission mode to A, and writes the setting to PAM 308. This is because with proof print mode, it is necessary to accumulate all of the pages of image data for at least one copy.

Then, in step S1108, image transmission is performed in the set image transmission mode. Since image transmission mode A was set in step S1105 in this case, the image processing apparatus 500 requests the RIP controller 105 for transmission of image data in the page order of the print document.

The further detailed processing in step S1108 is pursuant of FIG. 8. Since printing is performed in response to an instruction from the user, however, processing to store the image data spooled in the temporary area 306a to the memory box area 306b is performed at step S808. Note that storage to the memory box area 306b can be performed after all of the pages of image data have been acquired.

At step S1109, it is determined whether image transmission of all pages has been completed. If image transmission has been completed (step S1109: YES), processing is ended. On the other hand, if image transmission has not been completed (step S1109: NO), processing is repeated after returning to step S1108. That is, the same processing is repeated until all of the pages of image data have been spooled.

Note that the image processing apparatus 500 monitors whether a print instruction has been received from the user after all of the pages of image data have been stored in the memory box area 306b. If a print instruction is received, printing is performed using the image data in the memory box area 306b.

Next, if in step S1103 it is determined that the print mode is not proof printing (step S1103: NO), processing moves to step S1104. At step S1104, the CPU 211 determines whether mass printing has been specified. Mass printing is often not suitable for accumulating image data in the HDD 306 of the image processing apparatus 500. In view of this, printing is executed after switching the image transmission mode.

If mass printing is not specified (step S1104: NO), processing moves to step S1106. At step S1106, the CPU 211 sets the image transmission mode to B, and writes the setting to the RAM 308. This is because the inefficient use of the HDD 306 that occurs when all of the pages of image data are spooled is wasteful, making it preferable to erase the image data of pages that have been output.

Then, in step S1108, image transmission is performed in the set image transmission mode. Since image transmission mode B has been set in step S1106 in this case, the image processing apparatus 500 requests the RIP controller 105 for transmission of image data in the page order of the print document. Since the further detailed processing in step S1108 is pursuant of FIG. 9, description is omitted here.

Next, at step S1109, it is determined whether image transmission of all pages has been completed. If image transmission has been completed (step S1109: YES), processing is ended since this means that the required printing would also have been completed. On the other hand, if image transmission has not been completed (step S1109: NO), processing is repeated after returning to step S1108.

Next, if in step S1104 it is determined that mass printing has been specified (step S1104: YES), processing moves to step S1107. At step S1107, the CPU 211 sets the image transmission mode to C, and writes the setting to the RAM 308. This is because if the mass printing is enough to use up all the storable area in the HDD 306 (e.g., 100 pages or more), accumulating all of the pages of image data in the HDD, as is the case with image transmission mode A, will result in a shortage of storage area in the HDD. Even if image data is erased, as is the case with image transmission mode B, there is a strong possibility that a shortage of storage area in the HDD 306 will similarly occur.

Then, in step S1108, image transmission is performed in the set image transmission mode. Since image transmission mode C has been set in step S1107 in this case, the image processing apparatus 500 requests the RIP controller 105 for transmission of image data in the print order of the print document. Also, the image data of output images is erased from the HDD 306.

Next, at step S1109, it is determined whether image transmission of all pages has been completed. If image transmission has been completed (step S1109: YES), processing is ended since this means that the required printing would also have been completed. On the other hand, if image transmission has not been completed (step S1109: NO), processing is repeated after returning to step S1108.

According to the present embodiment, as seen above, processing can be performed efficiently by switching the mode of transmitting image data from the RIP controller 105 to the image processing apparatus 500 according to the specified print mode.

Other Embodiments

In the above first embodiment, the three image transmission modes A, B and C are used as image transmission modes for transmitting image data from the RIP controller 105 to the image processing apparatus 500. However, the embodiments of the invention are not limited to this embodiment. For example, the two image transmission modes A and B may be used, or the two image transmission modes A and C may be used.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system ox apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-029004, filed Feb. 6, 2006 which is hereby incorporated by reference herein in its entirety.

What is claimed is:

1. A printing apparatus that is configured to be connected to an external apparatus for temporarily storing a print job including a plurality of pages of image data, and that receives image data related to the print job from said external apparatus and performs printing using the received image data, comprising:
   a storage unit adapted to temporarily store image data related to the print job received from said external apparatus;
   a printing unit adapted to perform printing using image data related to the print job stored in said storage unit;
   a determination unit adapted to determine an amount of free area in said storage unit; and
   a control unit adapted to perform a control to switch storage of the image data in said storage unit from storing all of the pages of image data related to the print job to storing some of the pages of image data related to the print job, in response to the amount of free area determined by said determination unit becoming smaller than a predetermined area during printing by said printing unit;
   wherein said control unit switches from a first print mode for printing a plurality of copies using image data related to the print job received once from said external apparatus to a second print mode for printing a plurality of copies using image data related to the print job received a plurality of times from said external apparatus, in response to the amount of free area determined by said determination unit becoming smaller than a predetermined area during printing by said printing unit.

2. The printing apparatus according to claim 1, wherein the predetermined area is sufficient to store all of the pages of image data related to the print job.

3. The printing apparatus according to claim 1, wherein said control unit performs a control to erase pieces of image data stored in said storage unit that have been used in printing, in response to the amount of free area determined by said determination unit becoming smaller than the predetermined area.

4. The printing apparatus according to claim 1 wherein said control unit requests said external apparatus for transmission of image data related to the print job and performs a control to erase from said storage unit pieces of image data related to the print job received in response to the request that have been used in printing, in response to the amount of free area determined by said determination unit becoming smaller than the predetermined area.

5. A printing apparatus that is configured to be connected to an external apparatus for temporarily storing a print job including a plurality of pages of image data, and that receives image data related to the print job from said external apparatus and performs printing using the received image data, comprising:
   a storage unit adapted to temporarily store image data related to the print job received from said external apparatus;
   a printing unit adapted to perform printing using image data related to the print job stored in said storage unit;
   a determination unit adapted to determine what processing is to be executed using the image data; and
   a control unit adapted to perform a control so that storage of the image data in said storage unit is one of storing all of the pages of image data related to the print job and storing some of the pages of image data related to the print job, according to a result of the determination by said determination unit;
   wherein said control unit switches from a first print mode for printing a plurality of copies using image data related to the print job received once from said external apparatus to a second print mode for printing a plurality of copies using image data related to the print lob received a plurality of times from said external apparatus, in response to the amount of free area determined by said determination unit becoming smaller than a predetermined area during printing by said printing unit.

6. The printing apparatus according to claim 5, wherein said control unit requests said external apparatus for transmission of image data related to the print job and performs a control to erase from said storage unit pieces of image data related to the print job received in response to the request that have been used in printing, if it is determined by said determination unit that printing of image data exceeding a predetermined number of pages is to be performed.

7. The printing apparatus according to claim 5, wherein said control unit performs a control to store all of the received image data in said storage unit, if it is determined by said determination unit that processing to store the image data in said storage unit is to be performed.

8. An external apparatus connected to said printing apparatus of claim 1, comprising:
   a storage unit adapted to store image data; and
   a transmission unit adapted to transmit image data related to a print job stored in said storage unit to said printing apparatus, in response to a request from said printing apparatus.

9. An external apparatus connected to said printing apparatus of claim 5, comprising:
   a storage unit adapted to store image data; and
   a transmission unit adapted to transmit image data related to a print job stored in said storage unit to said printing apparatus, in response to a request from said printing apparatus.

10. A printing system comprising an external apparatus that temporarily stores a print job including a plurality of pages of image data, and a printing apparatus that is connected to said external apparatus and that receives image data related to the print job from said external apparatus and performs printing using the received image data, wherein
   said external apparatus includes:
   a first storage unit adapted to store image data; and
   a transmission unit adapted to transmit image data related to the print job stored in said first storage unit to said printing apparatus, in response to a request from said printing apparatus, and said printing apparatus includes:
- a second storage unit adapted to temporarily store image data related to the print job received from said external apparatus;
- a printing unit adapted to perform printing using image data related to the print job stored in said second storage unit;
- a determination unit adapted to determine an amount of free area in said second storage unit; and
- a control unit adapted to perform a control to switch storage of the image data in said second storage unit from storing all of the pages of image data related to the print job to storing some of the pages of image data related to the print job, in response to the amount of free area determined by said determination unit becoming smaller than a predetermined area during printing by said printing unit;
- wherein said control unit switches from a first print mode for printing a plurality of copies using image data related to the print job received once from said external apparatus to a second print mode for printing a plurality of copies using image data related to the print job received a plurality of times from said external apparatus, in response to the amount of free area determined by said determination unit becoming smaller than a predetermined area during printing by said printing unit.

11. A printing system comprising an external apparatus that temporarily stores a print job including a plurality of pages of image data, and a printing apparatus that is connected to said external apparatus and that receives image data related to the print job from said external apparatus and performs printing using the received image data, wherein
said external apparatus includes:
- a first storage unit adapted to store image data; and
- a transmission unit adapted to transmit image data related to the print job stored in said first storage unit to said printing apparatus, in response to a request from said printing apparatus, and said printing apparatus includes:
- a second storage unit adapted to temporarily store image data related to the print job received from said external apparatus;
- a printing unit adapted to perform printing using image data related to the print job stored in said second storage unit;
- a determination unit adapted to determine what processing is to be executed using the image data; and
- a control unit adapted to perform a control so that storage of the image data in said second storage unit is one of storing all of the pages of image data related to the print job and storing some of the pages of image data related to the print job, according to a result of the determination by said determination unit;
- wherein said control unit switches from a first print mode for printing a plurality of copies using image data related to the print lob received once from said external apparatus to a second print mode for printing a plurality of copies using image data related to the print lob received a plurality of times from said external apparatus, in response to the amount of free area determined by said determination unit becoming smaller than a predetermined area during printing by said printing unit.

12. A control method for a printing apparatus that is connected to an external apparatus for temporarily storing a print job including a plurality of pages of image data, and that includes a storage unit which temporarily stores image data related to the print job received from said external apparatus and a printing unit which performs printing of image data related to the print job stored in said storage unit, comprising the steps of:
- determining an amount of free area in said storage unit; and
- performing a control to switch storage of the image data in said storage unit from storing all of the pages of image data related to the print job to storing some of the pages of image data related to the print job, in response to the amount of free area determined in the determination step becoming smaller than a predetermined area during printing by said printing unit;
- wherein said control switches from a first print mode for printing a plurality of copies using image data related to the print lob received once from said external apparatus to a second print mode for printing a plurality of copies using image data related to the print lob received a plurality of times from said external apparatus, in response to the amount of free area determined by said determination step becoming smaller than a predetermined area during printing by said printing unit.

13. The control method for a printing apparatus according to claim 12, wherein the predetermined area is sufficient to store all of the pages of image data related to the print job.

14. The control method for a printing apparatus according to claim 12, wherein in the control step a control is performed to erase pieces of image data stored in said storage unit that have been used in printing, in response to the amount of free area determined in said determination unit becoming smaller than the predetermined area.

15. The control method for a printing apparatus according to claim 12, wherein in the control step a request is made to said external apparatus for transmission of image data related to the print job and a control is performed to erase from said storage unit pieces of image data related to the print job received in response to the request that have been used in printing, in response to the amount of free area determined in the determination step becoming smaller than the predetermined area.

16. A control method for a printing apparatus that is connected to an external apparatus for temporarily storing a print job including a plurality of pages of image data, and that includes a storage unit which temporarily stores image data related to the print job received from said external apparatus and a printing unit which performs printing of image data related to the print job stored in said storage unit, comprising the steps of:
- determining what processing is to be executed using the image data; and
- performing a control so that storage of the image data in said storage unit is one of storing all of the pages of image data related to the print job and storing some of the pages of image data related to the print job, according to a result of the determination in the determination step;
- wherein said control switches from a first print mode for printing a plurality of copies using image data related to the print lob received once from said external apparatus to a second print mode for printing a plurality of copies using image data related to the print lob received a plurality of times from said external apparatus, in response to the amount of free area determined by said determination step becoming smaller than a predetermined area during printing by said printing unit.

17. The control method for a printing apparatus according to claim 16, wherein in the control step a request is made to said external apparatus for transmission of image data related to the print job and a control is performed to erase from said storage unit pieces of image data related to the print job received in response to the request that have been used in printing, if it is determined in the determination step that printing of image data exceeding a predetermined number of pages is to be performed.

18. The control method for a printing apparatus according to claim 16, wherein in the control step a control is performed to store all of the received image data in said storage unit, if it is determined in the determination step that processing to store the image data in said storage unit is to be performed.

* * * * *